UNITED STATES PATENT OFFICE 2,461,874

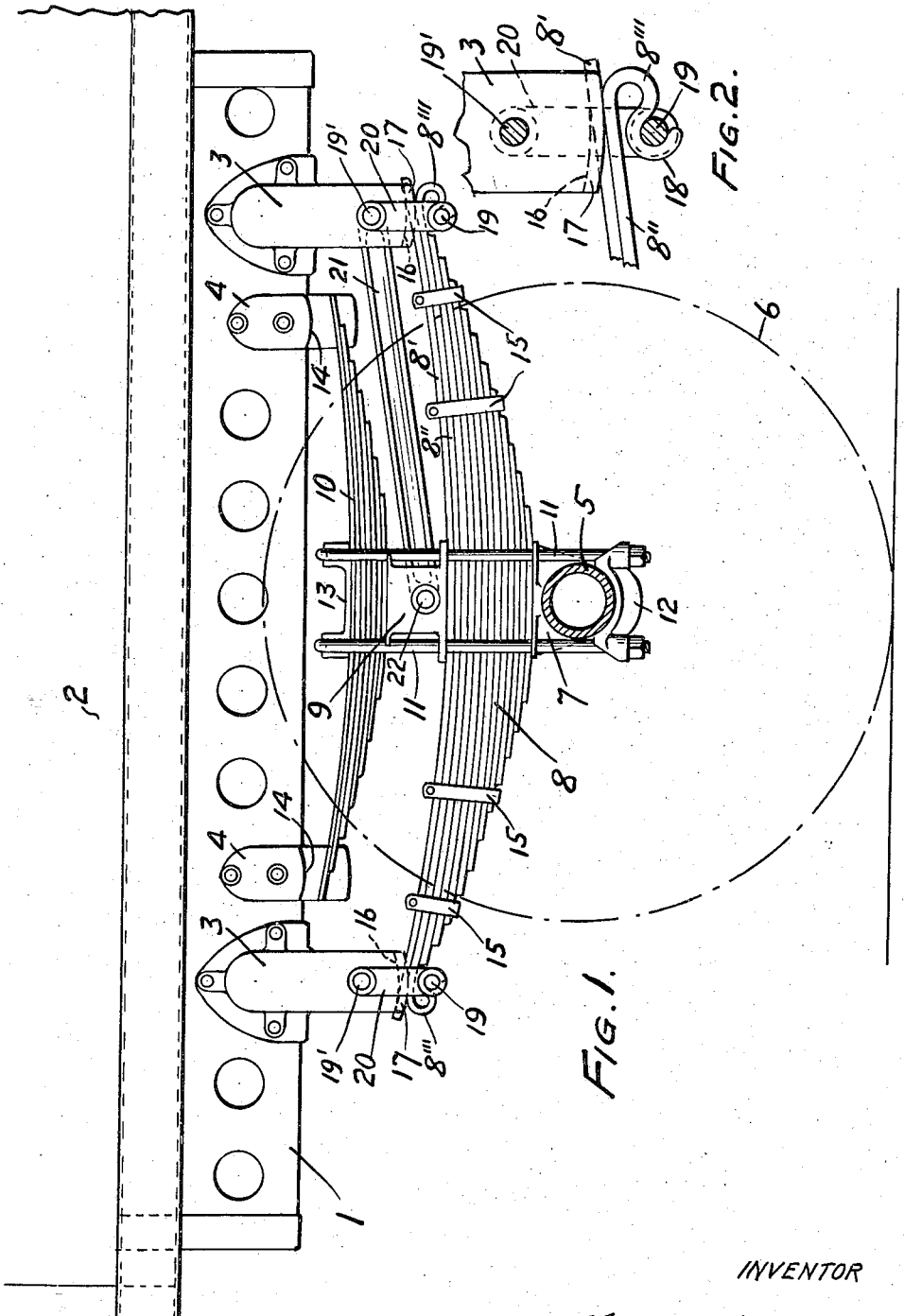

VEHICLE SPRING

Charles Bohlen, Jr., Jenkintown, Pa.

Application March 13, 1944, Serial No. 526,166

7 Claims. (Cl. 267—56)

This invention relates to a vehicle spring and more particularly to a spring so constructed and connected to a vehicle as to operate with great efficiency under heavy loads.

The spring structure in accordance with this invention is adapted for use in vehicles generally, but will be found especially adaptable for use in trucks, trailers, and the like, intended for the transportation of heavy loads.

Having now indicated, in a general way, the nature and purpose of this invention, I will proceed, for illustrative purposes, to a detailed description of a preferred embodiment thereof with reference to the accompanying drawings, in which:

Figure 1 is a side view of a spring according to this invention assembled with the rear axle of a trailer chassis, the trailer chassis being shown only in part.

Figure 2 is a fragmentary view showing a detail of construction.

The trailer chassis so far as illustrated comprises a frame member 1, for the support of a body 2, and to which are secured, by bolting, riveting, or other convenient manner, a pair of main spring hangers 3, 3, and a pair of auxiliary spring hangers 4, 4. Beneath the frame is a rear axle 5 carrying a wheel indicated at 6.

A spring chair 7 rests on the rear axle for the support of the main spring 8, upon which in turn rests a chair 9 for the support of an auxiliary spring 10. The springs 8 and 10 are secured to the axle by means of bolts 11, 11 and clips 12 and 13, which respectively are positioned to bear on the axle 5 and upon the auxiliary spring 10.

The auxiliary spring hangers 4, 4 are arranged to provide slipper bearings 14, 14 for the end portions of the top leaf of the auxiliary spring 10. And, as shown, the bearings 14, 14 are spaced above the spring 10 in normal position, to the end that the spring 10 will only become operative by contact with the bearings under heavy load or to relieve the main spring 8, when, under load and road shock, it is flexed downwardly beyond a certain point.

The main spring 8 is formed by a plurality of superimposed leaves secured together by clips 15, 15. The end portion of the top leaf 8' is adapted to bear on arcuate slipper bearings 16, 16 formed in the hangers 3, 3 and having depending side flanges 17, 17 to retain the spring from lateral movement.

The end portions of the second leaf 8", of the main spring 8, are bent under upon themselves to form arcuate spring elements 8''' at the ends of the leaf; and the extreme end portions are bent upon themselves to form open eyes or hooks 18, 18, for engagement with the lower shackle bolts 19, 19 of spring shackles 20, 20 secured to the hangers 3, 3 by means of shackle bolts 19', 19'.

A radius rod 21 is connected to the shackle bolt 19' and, by means of a pivot pin 22, to the auxiliary spring chair 9 to take the driving or traction strain away from the spring 8.

By virtue of the construction of the spring 8, it will be noted that it is operatively connected to the hangers 3, 3 through the slipper bearings 16, 16 engaged by the top leaf 8', and also by the shackles 20, 20, through the engagement of the eyes 18, 18 with the lower shackle bolts 19, 19. The spring shackles 20, 20 are so proportioned that when they are assembled with the spring hangers 3 and with the eyes 18 in leaf 8" of the spring 8, the spring elements 8''' at the ends of the leaf 8" will be preloaded or under initial tension. The forming of the eyes 18 as open eyes or hooks enables them to be readily snapped over the shackle bolts 19 to preload the spring elements 8'''.

When now the spring 8 is under load, it will normally operate through the bearings of the end portions of the upper leaf on the slipper bearings 16, 16. However, under road shock there is a tendency for the spring to bounce and to become disengaged from the slipper bearings 16, 16, with the result that the spring chatters on the bearings or may jump the flanges 17, 17 letting the body down. Under such conditions the provision of the spring elements 8''' and the connection of the spring to the hangers through the shackles 20, 20, will maintain the ends of the spring against the slipper bearings.

The preloading of, or the initial tension placed on the spring elements 8''' eliminates any possibility of rattle by maintaining a constant tension on the shackle bolts 19, 19' and thus taking up clearances caused by manufacturing tolerances and wear in the shackle bolts, and also taking up for wear between spring hangers 3, 3 and the main leaf 8' of the spring 8.

In short, when the spring 8 tends to bounce under road shock, the spring elements 8''' connected to the hangers 3, 3 through the shackles 20, 20, will counteract any tendency of the ends of the spring to leave the slipper bearings.

It will be appreciated that the structure according to this invention, described above in detail for illustrative purposes, may be variously modified without departing from the scope of this invention.

What I claim and desire to protect by Letters Patent is:

1. In combination a spring formed of a plurality of superimposed leaves, the leaf adjacent to the top leaf being bent downwardly upon itself to form a curved spring element and an eye, a spring hanger affording a slipper bearing for the top leaf of the spring and a spring shackle connected to the spring hanger and to said eye, with said curved spring element under tension.

2. In combination a spring formed of a plurality of superimposed leaves, an upper leaf being bent downwardly upon itself to form a curved spring element and an eye, a spring hanger affording a slipper bearing for the spring and a spring shackle connected to the spring hanger and to said eye with said curved spring element under initial tension between the shackle bolt and the upper leaf.

3. In combination a spring formed of a plurality of superimposed leaves, the leaf adjacent to the top leaf being bent downwardly upon itself to form a curved spring element and an eye, a spring hanger affording a slipper bearing for the top leaf of the spring and a spring shackle connected to the spring hanger and to said eye with said curved spring element under initial tension.

4. In combination a spring formed of a plurality of superimposed leaves, a spring hanger having a slipper bearing, the top leaf of the spring engaging said bearing, a shackle forming a connection between the hanger and an upper leaf of the spring, and curved spring means at the end of the upper leaf within the shackle for maintaining the top leaf in contact with the slipper bearing.

5. In combination a spring formed of a plurality of superimposed leaves, a spring hanger having a slipper bearing, the top leaf of the spring engaging said bearing, a shackle forming a connection between the hanger and the spring leaf adjacent to the top leaf, and curved spring means on the end of the leaf adjacent to the top leaf within the shackle, for maintaining the top leaf in contact with the slipper bearing.

6. In combination a spring formed of a plurality of superimposed leaves, an upper leaf being bent downwardly upon itself to form an eye, a spring hanger affording a slipper bearing for the top leaf, a spring shackle connected to the spring hanger and to said eye, and curved spring means between said eye and the upper leaf to maintain the top leaf in contact with the slipper bearing.

7. In combination a spring formed of a plurality of superimposed leaves, an upper leaf below the top leaf being bent downwardly upon itself to form a curved spring element and an eye, a spring hanger having a slipper bearing engaged by the top leaf of the spring and a spring shackle connected to the spring hanger and to said eye, the top leaf being held against the slipper bearing and maintained in contact therewith by the curved spring element on the upper leaf.

CHARLES BOHLEN, Jr.

REFERENCES CITED

The following references are of record in the file of this patent:

UNITED STATES PATENTS

| Number | Name | Date |
|---|---|---|
| 836,345 | Senderling | Nov. 20, 1906 |
| 838,792 | Lannert | Dec. 18, 1906 |
| 1,102,098 | Smith | June 30, 1914 |
| 1,334,700 | Hill | Mar. 23, 1920 |
| 1,586,164 | Tait | May 25, 1926 |
| 2,054,305 | Stilwell | Sept. 15, 1936 |
| 2,394,695 | Keller | Feb. 12, 1946 |

FOREIGN PATENTS

| Number | Country | Date |
|---|---|---|
| 344,298 | Great Britain | Mar. 5, 1931 |